United States Patent
Mathai et al.

(10) Patent No.: US 8,842,363 B2
(45) Date of Patent: Sep. 23, 2014

(54) DYNAMICALLY VARYING AN OPTICAL CHARACTERISTIC OF LIGHT BY A SUB-WAVELENGTH GRATING

(75) Inventors: Sagi Varghese Mathai, Palo Alto, CA (US); Jingjing Li, Palo Alto, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 12/696,682

(22) Filed: Jan. 29, 2010

(65) Prior Publication Data

US 2011/0188119 A1    Aug. 4, 2011

(51) Int. Cl.
*G02B 5/18*    (2006.01)
*G02B 27/44*    (2006.01)

(52) U.S. Cl.
CPC ...................................... *G02B 27/44* (2013.01)
USPC .......................................... 359/573; 359/569

(58) Field of Classification Search
None
See application file for complete search history.

(56) References Cited

U.S. PATENT DOCUMENTS

| | | |
|---|---|---|
| 5,726,805 A | 3/1998 | Kaushik et al. |
| 6,195,381 B1 | 2/2001 | Botez et al. |
| 6,590,267 B1 * | 7/2003 | Goodwin-Johansson et al. ............................. 257/415 |
| 6,697,405 B2 | 2/2004 | Kitatani et al. |
| 6,707,548 B2 | 3/2004 | Kreimer et al. |
| 6,741,624 B2 | 5/2004 | Mears et al. |
| 6,785,320 B1 | 8/2004 | Amos et al. |
| 6,818,959 B2 * | 11/2004 | Montelius et al. ............. 257/415 |
| 6,894,836 B2 * | 5/2005 | Christenson ................... 359/563 |
| 6,914,231 B1 | 7/2005 | Stone |
| 6,977,765 B1 * | 12/2005 | Yeo ................................ 359/291 |
| 7,096,498 B2 | 8/2006 | Judge |
| 7,106,920 B2 | 9/2006 | Liu |
| 7,173,764 B2 * | 2/2007 | Carr et al. ...................... 359/569 |
| 7,180,930 B2 | 2/2007 | Takaki et al. |
| 7,221,691 B2 | 5/2007 | Johnson et al. |
| 7,302,130 B2 | 11/2007 | Stone |
| 7,304,781 B2 | 12/2007 | Chang-Hasnain et al. |
| 7,386,205 B2 | 6/2008 | Wang et al. |
| 7,680,371 B2 | 3/2010 | Cheben et al. |
| 7,693,205 B2 | 4/2010 | Uchida |
| 2002/0073338 A1 | 6/2002 | Burrows et al. |

(Continued)

FOREIGN PATENT DOCUMENTS

| | | |
|---|---|---|
| WO | WO-2006125196 | 11/2006 |
| WO | WO-2011008216 | 1/2011 |
| WO | WO-2012105945 | 8/2012 |

OTHER PUBLICATIONS

Hewlett-Packard Development Company, L.P., "Non-Periodic Grating Reflectors With Focusing Power and Methods for Fabricating", Application. No. PCT/US09/51026, Filed Jul. 17, 2009.

(Continued)

*Primary Examiner* — Arnel C Lavarias (57) ABSTRACT

An apparatus for dynamically varying an optical characteristic of a light beam includes an optical element configured to receive a beam of light. The optical element includes at least one sub-wavelength grating formed of a plurality of lines. The apparatus includes at least one actuator connected to at least one component of the optical element and a controller for controlling the at least one actuator to dynamically vary a characteristic of the beam of light that is at least one of emitted through and reflected from the optical element.

18 Claims, 6 Drawing Sheets

(56) References Cited

U.S. PATENT DOCUMENTS

| | | |
|---|---|---|
| 2002/0080493 A1 | 6/2002 | Tsai et al. |
| 2003/0048824 A1 | 3/2003 | Shinagawa et al. |
| 2003/0235229 A1 | 12/2003 | Deng et al. |
| 2003/0235370 A1 | 12/2003 | Taillaert et al. |
| 2005/0013334 A1 | 1/2005 | Watanabe et al. |
| 2006/0232776 A1 | 10/2006 | Hairston et al. |
| 2006/0245464 A1 | 11/2006 | Hori et al. |
| 2006/0262250 A1 | 11/2006 | Hobbs |
| 2006/0273284 A1 | 12/2006 | Hirose |
| 2007/0115553 A1 | 5/2007 | Chang-Hasnain et al. |
| 2007/0153860 A1 | 7/2007 | Chang-Hasnain et al. |
| 2007/0165214 A1 | 7/2007 | Wu et al. |
| 2008/0267236 A1 | 10/2008 | Sigalas et al. |
| 2009/0196319 A1 | 8/2009 | Hori et al. |
| 2009/0324248 A1 | 12/2009 | Shiraki |
| 2010/0128749 A1 | 5/2010 | Amann et al. |
| 2011/0188119 A1 | 8/2011 | Mathai et al. |
| 2012/0105962 A1 | 5/2012 | Fattal et al. |

OTHER PUBLICATIONS

Hewlett-Packard Development Company, L.P., "Optical. Devices Based on Diffraction Gratings", Application No, PCT/US09/58006, Filed Sep. 23, 2009.

Christensen, et al., "Low-distortion hybrid optical shuffle concept", Optics Letters, Feb. 1, 1999, pp. 169-171, vol. 24, No. 3.

European Search Report (Supplementary), Apr. 26, 2013, EP Application No. 09849901.5.

Fattal, David, et al., "Flat Dielectric Grating Reflectors with High Focusing Power", 8 pages, <http://arvix.org/PScache/arxiv/pdf/1001/1 001.3711v1.pdf>, Jan. 21, 2010.

International Search Report, Aug. 2, 2011. PCT Application No. PCT/US2010/054740.

International Search Report, May 31, 2010. PCT Application No. PCT/US2009/058006.

Marino, Francesco, et al., "Single Mode Operation and Transverse Mode Control in VCSELs Induced by Frequency Selective Feedback", 3 pages, Dept. de Fisica Interdisciplinar, Institute Mediteraneo de Estudios Avanzados (CSIC-UIB), C/Miquel Marques 21, E-07190 Esporles, Spain.

Zhou, Ye, et al., "Transverse Mode Control in High-Contrast Subwavelength Grating VCSEL", 2 pages, Department of Electrical Engineering and Computer Sciences, University of California, Berkeley, USA, May 6-11, 2007.

International Search Report and Written Opinion, Sep. 27, 2010. PCT Application No. PCT/US2010/022632.

Berseth, C.-A. et al., "Vertical cavity surface emitting lasers incorporating structured mirrors patterned by electron-beam lithography", J. Vac. Sci. Technol. B, Nov. 1999, vol. 17, No. 6, pp. 3222-3225.

Chang-Hasnain, C. J. et al., "Tunable VCSEL Using High Contrast Grating", OSA CLE02009, May 2009.

International Search Report, Apr. 20, 2010, PCT Application No. PCT/US2009/051026.

International Search Report, Sep. 28, 2011, PCT Application No. PCT/US2011/023219.

* cited by examiner

DYNAMICALLY VARYING AN OPTICAL CHARACTERISTIC OF LIGHT BY A SUB-WAVELENGTH GRATING

CROSS-REFERENCE TO RELATED APPLICATIONS

The present application has the same Assignee and shares some common subject matter with PCT Application No. PCT/US2009/051026, entitled "NON-PERIODIC GRATING REFLECTORS WITH FOCUSING POWER AND METHODS FOR FABRICATING THE SAME", filed on Jul. 17, 2009, PCT Application Serial No. PCT/US2009/058006, entitled "OPTICAL DEVICES BASED ON DIFFRACTION GRATINGS", filed on Sep. 23, 2009, and PCT Application Serial No. PCT/US2010/022628, entitled "OPTICAL DEVICE FORMED OF AN ARRAY OF SUB-WAVELENGTH GRATINGS", filed on even date herewith, the disclosures of which are hereby incorporated by reference in their entireties.

BACKGROUND

Minimizing and/or increasing the beam width of a beam of light are important in a number of technology areas. For example, a minimized, or "spot size" of a focused beam of light is important for writing data to, or reading data from, an optical disk.

Figure 1:
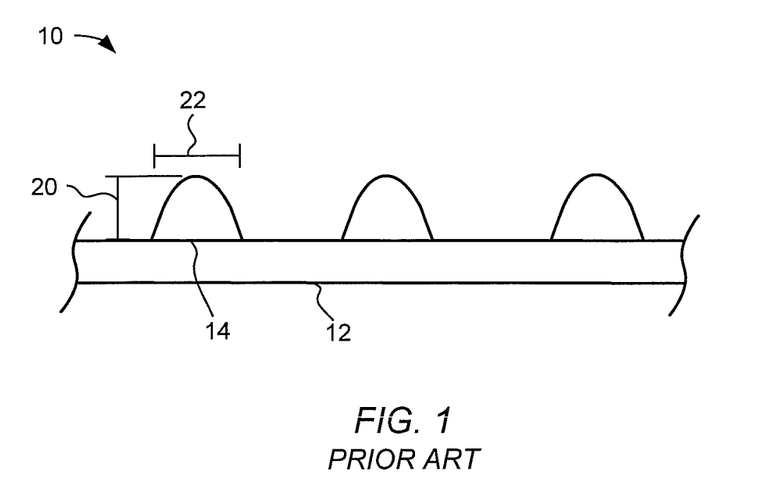
FIG. 1 shows a cross-sectional view of a conventional lens device.

A cross-sectional view of a conventional lens device 10 is depicted in FIG. 1. As shown therein, the conventional lens device 10 includes a plurality of lens elements 14 positioned on a substrate 12. The lens elements 14 have heights 20 and widths 22 that are at least 200 microns due to the current manufacturing processes available and the refractive index of the material used to fabricate the lens elements 14.

In order to obtain a small spot size, a beam is typically passed through the lens elements 14, which have a relatively high numerical aperture ("NA"). The NA of a convex lens can be increased by increasing the diameter of the lens and shortening its focal length. However, incorporating such lenses in optical-based devices may be cost prohibitive because of the difficulty in fabricating very small lenses with large curvatures and because of the precise polishing needed to make the lenses aberration free. In addition, conventional convex and concave lenses may not be compatible with planar integrated circuits.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the description of the embodiments.

Disclosed herein are embodiments directed to an apparatus for dynamically varying an optical characteristic of a light beam. The apparatus includes an optical element that includes at least one sub-wavelength dielectric grating ("SWG") formed of a plurality of lines configured to receive a beam of light. In some embodiments, the optical element is composed of a plurality of SWGs arranged in an array with respect to each other. In addition, in some embodiments, the one or more SWGs are arranged on a substantially planar substrate and have a thickness that is smaller than the wavelengths of colors of light, for instance, on the order of about 30-200 nanometers.

The lines of the SWG(s) are composed of a relatively higher refractive index material than the material used to form the substrate on which the SWG(s) may be disposed. As discussed herein, a refractive index of about 1.3 or greater may be considered as being a high refractive index. In addition, the SWG(s) generally operate to control wavefront shapes in beams of light that are redirected (refracted and/or reflected) by the SWG(s). Generally speaking, the period and duty cycle of the lines forming the SWG(s) are designed for each of the SWG(s) in the array to control the wavefront shapes as desired. In one regard, a uniform magnitude of refraction (or reflection) across the optical device may be achieved, but at each SWG, the phase of the refracted (or reflected) wavefront will be varied locally. In other words, if a plane wave is sent through (or reflected from) a particular SWG, the refractive (or reflective) wave will have a uniform magnitude, but the phase of the wave will be varied according to the design of that particular SWG. By selectively designing and arranging the SWGs according to the wavefront shapes of the SWGs, a combined wavefront from the SWGs having desired characteristics may be produced. In one regard, the optical device of the present invention may have a substantially planar structure, but may still operate as a refractive lens similar to conventional parabolic lenses or spherical lenses.

The apparatus also includes an actuator integrated with the optical element configured to manipulate at least one component (such as, a substrate, one or more sub-wavelength dielectric grating ("SWGs"), and/or line(s)) of the optical element to dynamically vary a characteristic of the light beam emitted through and/or reflected from the SWG(s). In addition, the actuator is configured to dynamically vary at least one of a position, orientation, and curvature of the optical element in response to receipt of a control signal from a controller.

Through implementation of the embodiments disclosed herein, a characteristic of a light beam emitted through and/or reflected from an apparatus having one or more SWGs may dynamically be varied. For instance, the direction in which the light beam is directed, the focus of the light beam, etc., may be dynamically varied to achieve one or more desired optical characteristics of the light beam.

In the following description, the term "light" refers to electromagnetic radiation with wavelengths in the visible and non-visible portions of the electromagnetic spectrum, including infrared and ultra-violet portions of the electromagnetic spectrum.

Figure 2:
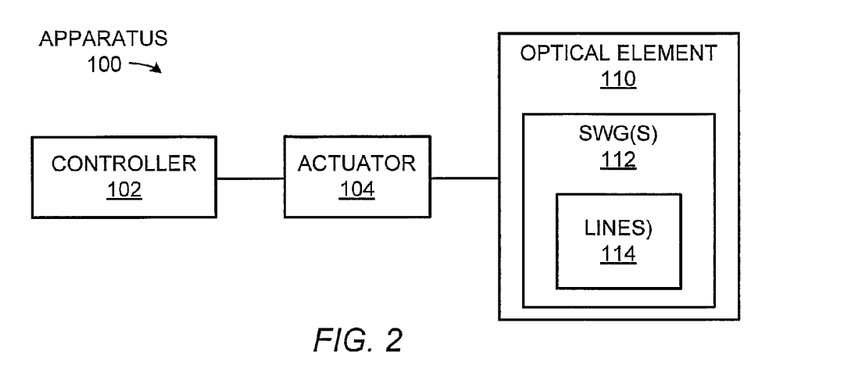
FIG. 2 illustrates a block diagram of an apparatus for dynamically varying an optical characteristic of a light beam, according to an embodiment of the invention.

With reference first to FIG. 2, there is shown a block diagram of an apparatus 100 for dynamically varying an optical characteristic of a light beam, according to an embodiment. It should be understood that the apparatus 100 depicted in FIG. 2 may include additional components and that some of the components described herein may be removed and/or modified without departing from a scope of the apparatus 100.

As depicted in FIG. 2, the apparatus 100 includes a controller 102, an actuator 104, and an optical element 110. The optical element 110 includes a plurality of components, which includes, at least one sub-wavelength dielectric grating ("SWG") 112 formed of a plurality of lines 114. Generally speaking, the controller 102 is programmed to control the actuator 104 to dynamically vary at least one of an orientation, a position, and a curvature of the component(s) of the optical element 110 to dynamically vary an optical characteristic of a light beam that is emitted through and/or reflected from the optical element 110. The optical characteristic may include, for instance, light beam direction (beam steering), focus, magnification, collimation, etc.

Thus, for instance, the actuator 104 may be configured to rotate the component(s) of the optical element 110 about one or more of the x, y, and z-axes. In addition, or alternatively, the actuator 104 may be configured to vary the position or change the curvature of the component(s) of the optical element 110 in one or more of the x, y, and z-directions. As another example, the actuator 104 may be configured to rotate, position, and/or change the curvature of the SWG(s) 112 independently of, for instance, a substrate 116 (shown in later figures) of the optical element 110. As a further example, the actuator 104 may be configured to rotate, position, and/or change the curvature of individual lines 114 of the SWG(s) 112 independently of, for instance, the substrate 116 and/or other individual lines 114.

The controller 102 may comprise any suitable hardware component configured to perform one or more processing functions, such as, a computing device, a processor, an application specific integrated controller (ASIC), etc. The controller 102 may also comprise software stored on a computer readable storage medium as discussed in greater detail herein below. In any regard, the controller 102 may be programmed to identify how the actuator 104 is to be operated to cause the component(s) of the optical element 110 to obtain a desired optical characteristic of a light beam that is transmitted through the optical element 110. In addition, the controller 102 may control the actuator 104 to change at least one of the orientation, position, and curvature of the component(s) of the optical element 110 to obtain the desired optical characteristic of the light beam.

The actuator 104 may comprise any suitable mechanical, electrical, and/or chemical device capable of varying at least one of the orientation, position, and curvature of the component(s) of the optical element 110. Examples of suitable actuators include electrostatic, magnetic, piezoelectric, thermal, combinations thereof, etc. Particular examples of suitable actuators are any number of conventional microelectromechanical systems (MEMS) actuators. According to a particular example, the actuator 104 is configured to apply a current through one or more of the lines 114, which causes the one or more lines 114 to move either toward or away from the substrate 116 or one or more other lines 114. The movement may cause the one or more lines 114 to become repositioned if the ends of the one or more lines 114 are relatively movable with respect to the substrate 116. In addition, or alternatively, the movement may cause the curvature of the one or more lines 114 to change if the ends of the one or more lines 114 are relatively fixed with respect to the substrate 116. Examples of manners in which the one or more lines 114 may be manipulated are provided with respect to FIGS. 4 and 5 below.

Specific examples of the optical element 110 having various configurations and actuator 104 control are described with respect to the following figures. In the discussions of the following figures, various apparatuses for dynamically varying an optical characteristic of a light beam according to various embodiments are described. It should be understood that the apparatuses depicted in the following figures may include additional components and that some of the components described herein may be removed and/or modified without departing from scopes of the apparatuses.

Figure 3:
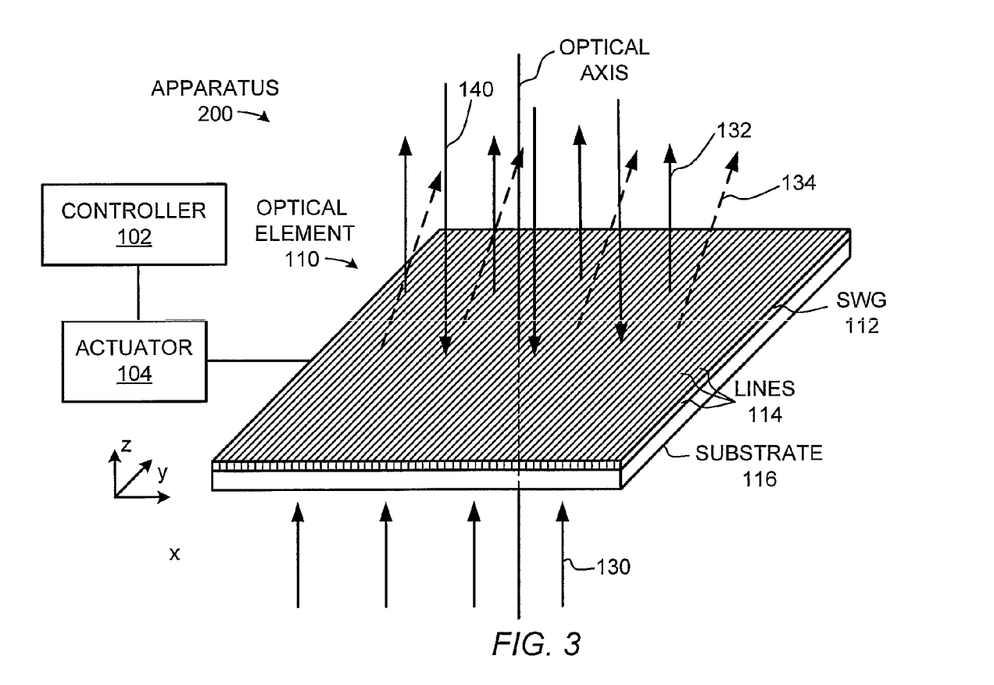
FIG. 3 illustrates a diagram of an apparatus for dynamically varying an optical characteristic of a light beam, according to an embodiment of the invention.

With reference first to FIG. 3, there is shown a diagram of an apparatus 200 for dynamically varying an optical characteristic of a light beam, according to an embodiment. As shown therein, the optical element 110 comprises a SWG 112 disposed with respect to a substrate 116. The SWG 112 is formed of a plurality of lines 114. The lines 114 may have substantially similar configurations with respect to each other or one or more of the lines 114 may have different characteristics as compared with one or more other lines 114 as discussed in greater detail in the related applications discussed above.

In one embodiment, the lines 114 of the SWG 112 are disposed on the substrate 116 and thus relative movement between the lines 114 and the substrate 116 is prevented. In one example of this embodiment, the actuator 104 may be connected to the substrate 116 and may vary at least one of the orientation, position, and curvature of the optical element 110 through application of a mechanical and/or electrical actuation on the substrate 116. In another example of this embodiment, the actuator 104 may be connected to one or more lines 114 of the SWG 112 and may vary at least one of the orientation, position, and curvature of the optical element 110 through application of a mechanical and/or electrical actuation on the one or more lines 114.

In another embodiment, the lines 114 are spaced from the substrate 116 to thus enable the SWG 112 and/or the lines 114 to be dynamically oriented, positioned and/or curved with respect to the substrate 116. In this embodiment, the space between the lines 114 and the substrate 116 may be empty or may be filled with a flexible material to enable the relative rotation, position, and/or change in curvature. Alternatively, in this embodiment, the substrate 116 may be removed altogether and the lines 114 may be suspended, for instance, at respective ends thereof to the actuator 104.

In any regard, and as depicted in FIG. 3, light beams entering into the SWG 112 (represented by the arrows 130) may exit the SWG 112 in a first direction (represented by the arrows 132) with respect to the optical axis of the SWG 112 when the SWG 112 is in a first position/orientation/curvature. However, when the actuator 104 is implemented to change at least one of the orientation, position, and curvature of the optical element 110 as a whole or the SWG 112 itself, the light beams are depicted as exiting the SWG 112 in a second direction (represented by the arrows 134). In addition, or alternatively, the SWG 112 may be configured to reflect light beams (represented by the arrows 140) in a first direction (represented by the arrows 132) when the SWG 112 is in a first position/orientation/curvature and to reflect light beams (represented by the arrows 134) when the SWG 112 is in a second position/orientation/curvature.

Although the change in direction of the light beams has been depicted as being uniform throughout the surface of the SWG 112, it should be understood that the direction of the light beams may differ for different sections of the SWG 112. Thus, for instance, one set of lines 114 of the SWG 112 may be configured to cause light beams to be directed into one direction while another set of lines 114 of the SWG 112 may be configured to cause light beams to be directed into another direction. In one regard, therefore, by controlling, for instance, the position of the SWG 112 with respect to an incoming light beam, the directions in which the light beams are directed may be varied as desired.

Figure 4:
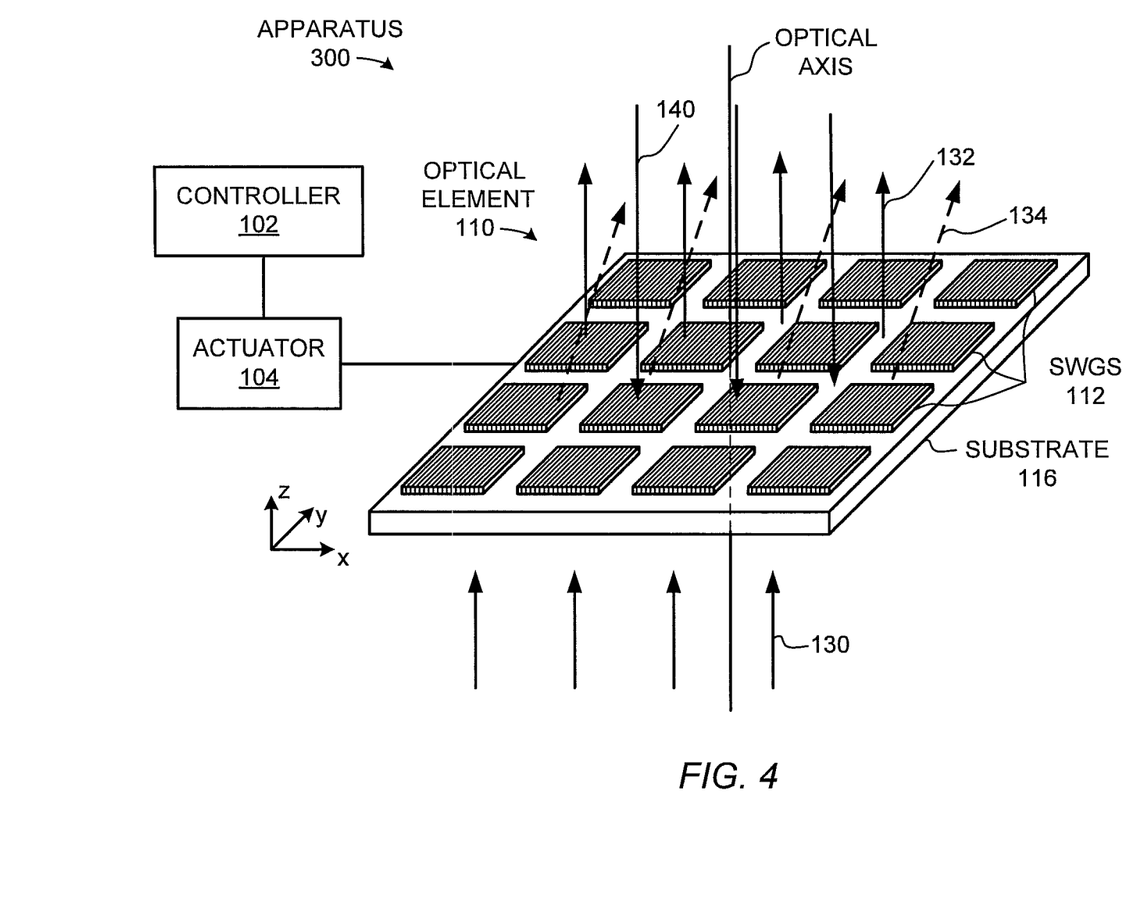
FIG. 4 illustrates a diagram of an apparatus for dynamically varying an optical characteristic of a light beam, according to another embodiment of the invention.

With reference now to FIG. 4, there is shown a diagram of an apparatus 300 for dynamically varying an optical characteristic of a light beam, according to another embodiment. As shown therein, the optical element 110 comprises a lens array formed of a plurality of the SWGs 112 depicted in FIG. 2. In one example, the optical element 110 is identical to the lens array disclosed in PCT Application Serial No. PCT/US2010/022628. As discussed therein, the SWGs 112 may be configured to produce a desired combined phase change in beams of light re-directed by the SWGs 112. The SWGs 112 may thus have similar configurations with respect to each other or one or more of the SWGs 112 may have different configurations with respect to each other. Furthermore, each of the SWGs 112 is composed of a relatively higher refractive index material than the substrate 116. For example, the SWGs 112 may be composed of silicon ("Si") and the substrate 116 may be composed of quartz or silicon dioxide ("SiO$_2$"), or the SWGs 112 may be composed of gallium arsenide ("GaAs") and the substrate 116 may be composed of aluminum gallium arsenide ("AlGaAs") or aluminum oxide ("Al$_2$O$_3$").

In one embodiment, all of the SWGs 112 of the lens array are disposed on the substrate 116 and thus relative movement between the SWGs 112 and the substrate 116 is substantially prevented. In one example of this embodiment, the actuator 104 may be connected to the substrate 116 and may vary at least one of the orientation, position, and curvature of the optical element 110 through application of a mechanical and/or electrical actuation on the substrate 116. In another example of this embodiment, the actuator 104 may be connected to one or more of the SWGs 112 and may vary at least one of the orientation, position, and curvature of the optical element 110 through application of a mechanical and/or electrical actuation on the one or more SWGs 112 or the lines 114 of the one or more SWGs 112.

In another embodiment, one or more of the SWGs 112 are spaced from the substrate 116 to thus enable the one or more SWGs 112 and/or the lines 114 of the one or more SWGs 112 to be dynamically oriented, positioned and/or curved with respect to the substrate 116. In this embodiment, the space between the lines 114 and the substrate 116 may be empty or may be filled with a flexible material to enable the relative rotation, position, and/or change in curvature. In addition, or alternatively, the lines 114 of at least one of the SWGs 112 may be connected to each other by a connecting element (not shown) such that the at least one SWG 112 may be individually oriented, positioned and/or curved from other SWGs 112. Alternatively, in this embodiment, the substrate 116 may be removed altogether and the SWGs 112 may be suspended, for instance, at respective ends thereof to the actuator 104.

As also depicted in FIG. 4, light beams entering into the SWGs 112 (represented by the arrows 130) may exit the SWGs 112 in a first direction (represented by the arrows 132) with respect to the optical axis of the SWGs 112 when the SWGs 112 are in a first position/orientation/curvature. However, when the actuator 104 is implemented to change at least one of the orientation, position, and curvature of the optical element 110 as a whole or one or more of the SWGs 112, the light beams are depicted as exiting the SWGs 112 in a second direction (represented by the arrows 134). In addition, or alternatively, the SWG 112 may be configured to reflect light beams (represented by the arrows 140) in a first direction (represented by the arrows 132) when the SWG 112 is in a first position/orientation/curvature and to reflect light beams (represented by the arrows 134) when the SWG 112 is in a second position/orientation/curvature.

Although the change in direction of the light beams has been depicted as being uniform throughout the surfaces of the SWGs 112, it should be understood that the directions of the light beams may differ for different ones or sections of the SWGs 112. Thus, for instance, one or more of the SWGs 112 may be configured to cause light beams to be directed into one direction while one or more other SWGs 112 may be configured to cause light beams to be directed into another direction. In one regard, therefore, by controlling, for instance, the positions of the SWGs 112 with respect to an incoming light beam, the directions in which the light beams are directed may be varied as desired.

Figure 5:
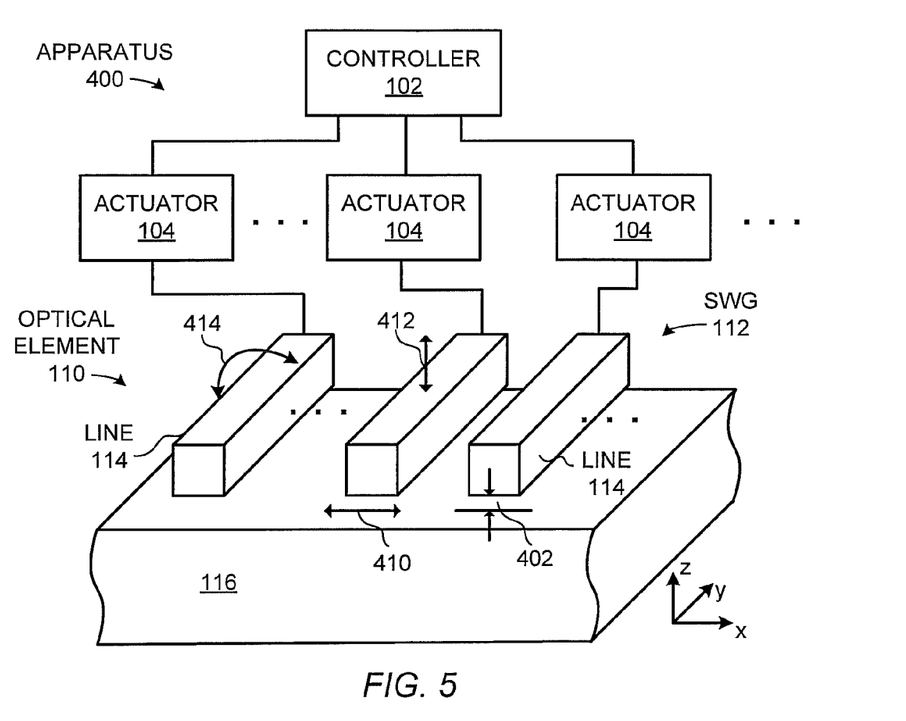
FIG. 5 illustrates a diagram of an apparatus in which multiple actuators are configured to individually manipulate the lines of an SWG to vary an optical characteristic of a light beam transmitted through the lines, according to an embodiment of the invention.

With reference now to FIG. 5, there is shown a diagram of an apparatus 400 in which multiple actuators 104 are configured to individually manipulate the lines 114 of an SWG 112 to vary an optical characteristic of a light beam transmitted through the lines 114, according to an embodiment. As shown in the apparatus 400, each of the actuators 104 is connected to and configured to manipulate a respective line 114. In addition, the lines 114 are depicted as being spaced 402 from a top surface of the substrate 116 to thus allow the lines 114 to be separately movable with respect to the substrate 116.

In one example, the actuators 104 are configured to manipulate the positions of the lines 114 by causing the lines 114 to move in the x-direction as noted by the arrow 410. In another example, the actuators 104 are configured to manipulate the positions of the lines 114 by causing the lines 114 to move in the z-direction as noted by the arrow 412. As a further example, the actuators 104 are configured to manipulate the orientations of the lines 114 by causing the lines 114 to rotate about, for instance, the y-axis as noted by the arrow 414.

In each of the examples discussed above, the actuators 104 may be connected to respective ends of the lines 114 and may suspend the lines 114 above the substrate 116. Alternatively, the actuators 104 may be connected to one of the ends of each of the lines 114 and the opposite ends of the lines 114 may be connected to another component separate from the substrate 116 to thus suspend the lines 114 above the substrate 116. Alternatively, the lines 114 may be designed to function as actuators themselves, for instance, through receipt of electrical energy. As a further alternative, a flexible material may be provided in the space 402, which allows for movement of the lines 114 with respect to the substrate 116.

Figure 6:
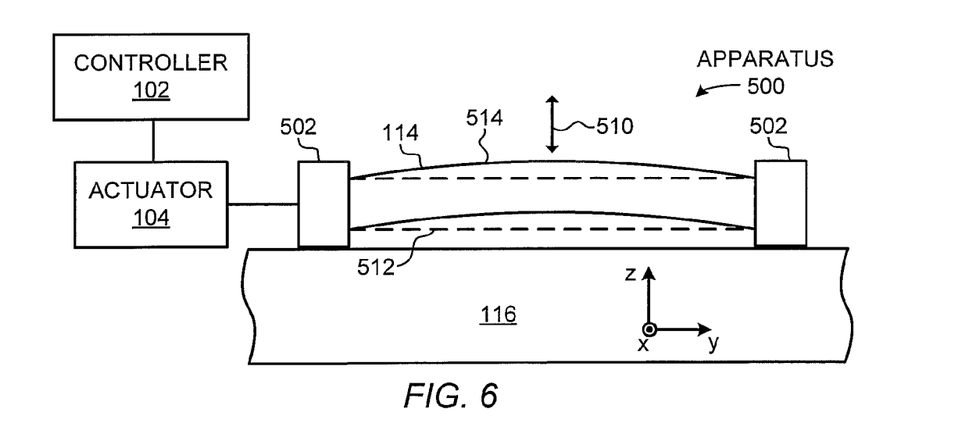
FIG. 6 illustrates a diagram of an apparatus in which multiple actuators are configured to individually manipulate the lines of an SWG to vary any optical characteristic of a light beam transmitted through the lines, according to an embodiment of the invention.

With reference now to FIG. 6, there is shown a diagram of an apparatus 500 in which multiple actuators 104 are configured to individually manipulate the lines 114 of an SWG 112 to vary an optical characteristic of a light beam transmitted through the lines 114, according to another embodiment. As shown therein, the line 114 is suspended above a surface the substrate 116 by a pair of suspending elements 502, which are disposed on the surface of the substrate 116. It should be understood that the other lines 114 may be similarly situated with respect to the substrate 116.

In the embodiment depicted in FIG. 6, the actuator 104 is configured to cause the line 114 to become curved as represented by the arrow 510. For instance, the actuator 104 is configured to cause the line 114 to go from an initial zero curvature 512 to a final curvature 514. Alternatively, however, the initial curvature may comprise the curved arrangement 514 and the final curvature may comprise the relatively straight arrangement 512. As such, the lines 114 may initially be biased to be curved 514 and the actuators 104 may be configured to cause the lines 114 to move toward the substrate 116 through application of an electrical force through both the lines 114 and the substrate 116.

In the embodiment depicted in FIG. 6, either or both of the lines 114 and the suspending elements 502 are formed of a relatively flexible material to thus enable the curvature of the lines 114 to be varied.

Figure 7:
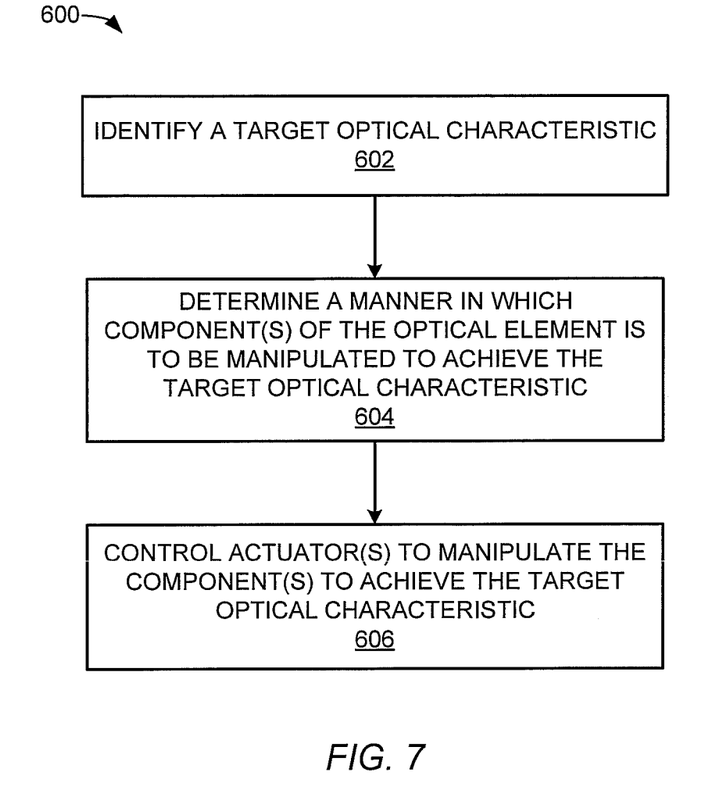
FIG. 7 shows a flow diagram of a method for dynamically varying an optical characteristic of a light beam with an optical element comprising at least one SWG formed of a plurality of lines, according to an embodiment of the invention.

Turning now to FIG. 7, there is shown a flow diagram of a method 600 for dynamically varying an optical characteristic of a light beam with an optical element 110 comprising at least one SWG 112 formed of a plurality of lines 114, according to an embodiment. It should be understood that the method 600 may include additional steps and that some of the steps described herein may be removed and/or modified without departing from a scope of the method 600.

At step 602, a target optical characteristic of the light beam emitted from the at least one SWG 112 of the optical element 110 is identified by a computing device, such as the controller 102. The target optical characteristic corresponds to a desired direction, magnification, focus, etc., of the light beam emitted from the at least one SWG 112. By way of example, the target optical characteristic corresponds to a desired wavefront shape in beams of light redirected by the at least one SWG 112. Accordingly, the target optical characteristic may be identified based upon an intended implementation of the optical element 110. In addition or alternatively, the computing device may receive instructions from a user or other computing device pertaining to the target optical characteristic.

At step 604, the computing device may determine a manner in which at least one component (for instance, an SWG 112 and/or a line 114) of the optical element 110 is to be manipulated to achieve the target optical characteristic. Thus, for instance, if the intended implementation of the optical element 110 is to cause light beams to converge to a target focal point, the computing device may calculate the positional change required of the component(s) of the optical element 110 to cause the light beams redirected and/or reflected by the at least one SWG 112 to converge to the target focal point.

At step 606, the computing device controls at least one actuator 104 to manipulate the component(s) of the optical element 110 as determined at step 604 to achieve the target optical characteristic. The computing device may control the at least one actuator 104 by, for instance, controlling the supply of electrical energy to the at least one actuator 104 or communicating an instruction signal to the at least one actuator 104.

Figure 8:
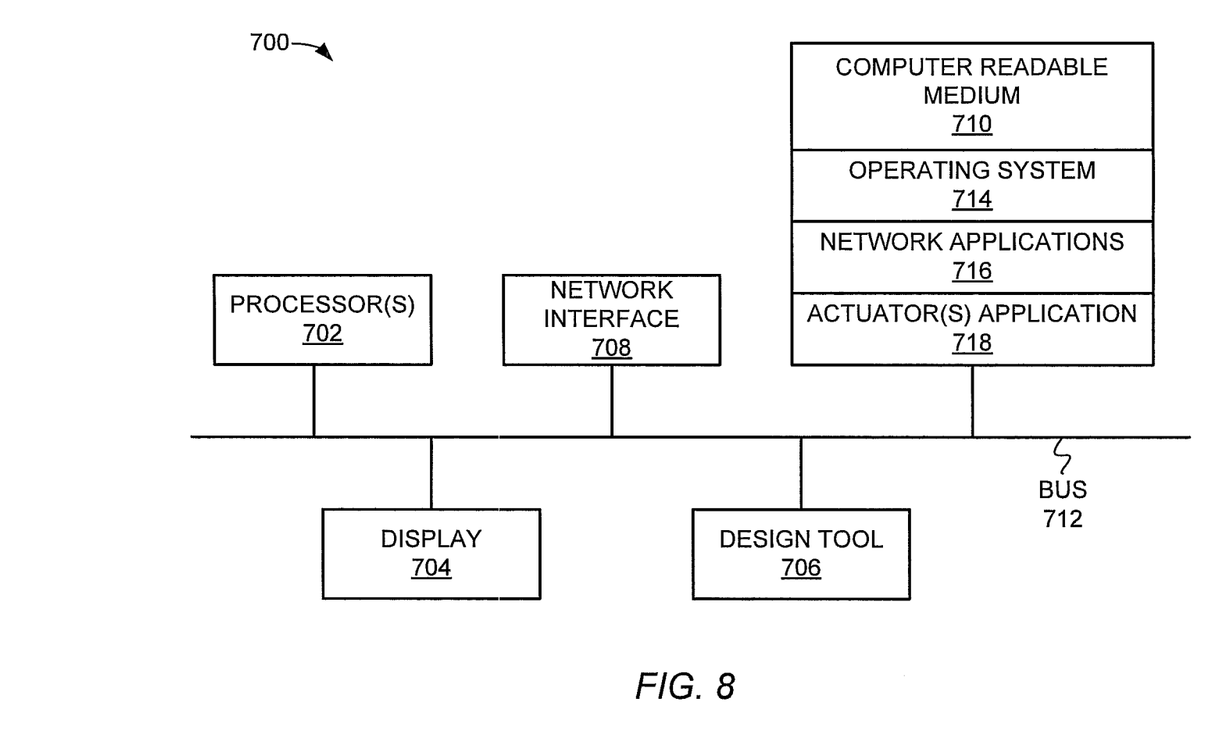
FIG. 8 shows a schematic representation of a computing device configured in accordance with embodiments of the present invention.

The methods employed to dynamically vary an optical characteristic of a light beam with reference to FIG. 7 may thus be implemented by the computing device, which may be a desktop computer, laptop, server, etc. Turning now to FIG. 8, there is shown a schematic representation of a computing device 700 configured in accordance with embodiments of the present invention. The device 700 includes one or more processors 702, such as a central processing unit; one or more display devices 704, such as a monitor; a design tool interface 706; one or more network interfaces 708, such as a Local Area Network LAN, a wireless 802.11x LAN, a 3G mobile WAN or a WiMax WAN; and one or more computer-readable mediums 710. Each of these components is operatively coupled to one or more buses 712. For example, the bus 712 may be an EISA, a PCI, a USB, a FireWire, a NuBus, or a PDS.

The computer readable medium 710 may be any suitable medium that participates in providing instructions to the processor 702 for execution. For example, the computer readable medium 710 can be non-volatile media, such as an optical or a magnetic disk; volatile media, such as memory; and transmission media, such as coaxial cables, copper wire, and fiber optics. Transmission method can also take the form of acoustic, light, or radio frequency waves. The computer readable medium 710 can also store other software applications, including word processors, browsers, email, Instant Messaging, media players, and telephony software.

The computer-readable medium 710 may also store an operating system 714, such as Mac OS, MS Windows, Unix, or Linux; network applications 716; and a grating application 718. The operating system 714 may be multi-user, multiprocessing, multitasking, multithreading, real-time and the like. The operating system 714 may also perform basic tasks such as recognizing input from input devices, such as a keyboard or a keypad; sending output to the display 704 and the design tool 706; keeping track of files and directories on medium 710; controlling peripheral devices, such as disk drives, printers, image capture device; and managing traffic on the one or more buses 712. The network applications 716 includes various components for establishing and maintaining network connections, such as software for implementing communication protocols including TCP/IP, HTTP, Ethernet, USB, and FireWire.

The actuator(s) application 718 provides various software components for dynamically varying an optical characteristic of a light beam with an optical element comprising at least one SWG formed of a plurality of lines, as described above. In certain embodiments, some or all of the processes performed by the application 718 may be integrated into the operating system 714. In certain embodiments, the processes can be at least partially implemented in digital electronic circuitry, or in computer hardware, firmware, software, or in any combination thereof.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. An apparatus for dynamically varying an optical characteristic of a light beam, said apparatus comprising:
   an optical element to receive a beam of light, said optical element comprising a substrate and at least one subwavelength grating formed of a plurality of lines arranged along a common plane with respect to each other;

at least one actuator connected to at least one of the plurality of lines, wherein the at least one of the plurality of lines is suspended above a surface of the substrate by a pair of suspending elements, wherein the pair of suspending elements are spaced apart from each other, and wherein the at least one actuator is to vary a curvature of the at least one of the plurality of lines in a direction that is perpendicular to the common plane in which the plurality of lines are arranged; and a controller to control the at least one actuator to vary the curvature of the at least one of the plurality of lines and thereby dynamically vary a characteristic of the beam of light that is at least one of emitted through and reflected from the optical element.

2. The apparatus according to claim 1, wherein the at least one actuator comprises an actuator selected from the group consisting of an electrostatic actuator, a magnetic actuator, a piezoelectric actuator, a thermal actuator, and combinations thereof.

3. The apparatus according to claim 1, further comprising another actuator connected to the at least one sub-wavelength grating, and wherein the another actuator is to dynamically vary at least one of an orientation and a position of the sub-wavelength grating.

4. The apparatus according to claim 1, wherein the at least one line comprises an electrically conductive element, and wherein the at least one actuator is to supply an electrical charge through the electrically conductive element to vary the curvature of the at least one line of the plurality of lines.

5. The apparatus according to claim 1, wherein the optical element comprises a lens array formed of a plurality of distinct sub-wavelength gratings, each of the plurality of sub-wavelength gratings formed of a plurality of lines.

6. The apparatus according to claim 5, further comprising a plurality of actuators to dynamically vary a characteristic of the beam of light by varying a curvature of the at least one of the plurality of distinct sub-wavelength gratings.

7. The apparatus according to claim 1, wherein the optical element comprises a plurality of components, said apparatus further comprising:

a plurality of actuators, wherein the plurality of actuators are connected to respective lines of the plurality of lines, wherein the plurality of actuators are to vary curvatures of the plurality of lines; and wherein the controller is to control the plurality of actuators to vary the curvatures of the plurality of lines and thereby dynamically vary a characteristic of the light beam that is at least one of emitted through and reflected from each of the plurality of components.

8. The apparatus according to claim 7, wherein the controller is to control the plurality of actuators to vary the curvatures of the plurality of lines to achieve a target optical characteristic of the light beam.

9. The apparatus according to claim 7, wherein the plurality of lines are to be curved in a direction perpendicular to the common plane.

10. The apparatus according to claim 7, wherein the plurality of lines are to be varied from a straight arrangement to a curved arrangement by the plurality of actuators.

11. The apparatus according to claim 7, wherein the plurality of lines are to be varied from a curved arrangement to a straight arrangement by the plurality of actuators.

12. The apparatus according to claim 1, wherein the at least one of the plurality of lines is to be varied from a straight arrangement to a curved arrangement by the at least actuator.

13. The apparatus according to claim 1, wherein the at least one of the plurality of lines is to be varied from a curved arrangement to a straight arrangement by the at least actuator.

14. A method for dynamically varying an optical characteristic of a light beam with an optical element comprising a substrate and at least one sub-wavelength grating formed of a plurality of lines that are arranged along a common plane with respect to each other, said method comprising:

identifying, by a computing device, a target optical characteristic of the light beam that is at least one of emitted through and reflected from the at least one sub-wavelength grating; and controlling at least one actuator to vary the curvature of at least one of the plurality of lines in a direction that is perpendicular to the common plane in which the plurality of lines are arranged to achieve the target optical characteristic, wherein the at least one of the plurality of lines is suspended above a surface of the substrate by a pair of suspending elements, wherein the pair of suspending elements are spaced apart from each other.

15. The method according to claim 14, further comprising:

determining a manner in which the curvature of the at least one of the plurality of lines is to be varied to achieve the target optical characteristic; and wherein controlling the at least one actuator further comprises controlling the at least one actuator to vary the curvature of the at least one of the plurality of lines according to the determined manner.

16. The method according to claim 14, wherein another actuator is connected to the at least one sub-wavelength grating, said method further comprising controlling the another actuator to dynamically vary a characteristic of the beam of light by varying at least one of an orientation, a position, and a curvature of the at least one sub-wavelength grating.

17. The method according to claim 14, further comprising determining how curvatures of a plurality of components are to be varied to achieve the desired optical characteristic, and wherein controlling the at least one actuator further comprises controlling a plurality of actuators to vary the curvatures of the plurality of components according to the determined curvatures of the plurality of components to dynamically vary a characteristic of the light beam that is at least one of emitted through and reflected from each of the plurality of components.

18. A non-transitory computer readable storage medium on which is embedded one or more computer programs, said one or more computer programs implementing a method for dynamically varying an optical characteristic of a light beam with an optical element comprising a substrate and at least one sub-wavelength grating formed of a plurality of lines arranged along a common plane with respect to each other, said one or more computer programs comprising a set of instructions to:

identify a target optical characteristic of the light beam that is at least one of emitted from and reflected from the at least one sub-wavelength grating; and control at least one actuator to vary the curvature of at least one of the plurality of lines in a direction that is perpendicular to the common plane in which the plurality of lines are arranged to achieve the target optical characteristic, wherein at least one of the plurality of lines is suspended above a surface of the substrate by a pair of suspending elements, wherein the pair of suspending elements are spaced apart from each other.

\* \* \* \* \*